(12) United States Patent
Saban et al.

(10) Patent No.: US 7,208,854 B1
(45) Date of Patent: Apr. 24, 2007

(54) ROTOR COOLING SYSTEM FOR SYNCHRONOUS MACHINES WITH CONDUCTIVE SLEEVE

(75) Inventors: Daniel M. Saban, Rockford, IL (US); Jeffrey Hoobler, Chicago, IL (US)

(73) Assignee: Hamilton Sundstrand Corporation, Hartford, CT (US)

( * ) Notice: Subject to any disclaimer, the term of this patent is extended or adjusted under 35 U.S.C. 154(b) by 0 days.

(21) Appl. No.: 11/371,404

(22) Filed: Mar. 9, 2006

(51) Int. Cl.
*H02K 9/009* (2006.01)
*H02K 9/19* (2006.01)

(52) U.S. Cl. .............................. 310/61; 310/52; 310/54
(58) Field of Classification Search ................. 310/52, 310/54, 58, 61
See application file for complete search history.

(56) References Cited

U.S. PATENT DOCUMENTS

| | | | |
|---|---|---|---|
| 4,139,789 A * | 2/1979 | Hunt ........................ | 310/40 R |
| 4,156,172 A | 5/1979 | Hucker et al. | |
| 4,311,932 A * | 1/1982 | Olson ......................... | 310/61 |
| 4,329,603 A | 5/1982 | Ballard | |
| 4,513,218 A | 4/1985 | Hansen | |
| 4,621,210 A | 11/1986 | Krinickas, Jr. | |
| 4,647,805 A | 3/1987 | Flygare et al. | |
| 4,797,590 A | 1/1989 | Raad et al. | |
| 5,006,741 A | 4/1991 | Schott | |
| 5,166,564 A | 11/1992 | Shahamat et al. | |
| 5,365,133 A | 11/1994 | Raad | |
| 5,587,647 A | 12/1996 | Bansal et al. | |
| 5,825,107 A | 10/1998 | Johnson et al. | |
| 6,091,168 A | 7/2000 | Halsey et al. | |
| 6,583,995 B2 | 6/2003 | Kalman et al. | |
| 6,628,022 B2 | 9/2003 | Clayton et al. | |
| 6,750,572 B2 | 6/2004 | Tornquist et al. | |
| 6,819,016 B2 | 11/2004 | Houle et al. | |
| 6,885,120 B2 * | 4/2005 | Kaminski et al. ............. | 310/85 |
| 6,897,581 B2 | 5/2005 | Doherty et al. | |
| 6,903,470 B2 | 6/2005 | Doherty et al. | |
| 6,965,185 B1 * | 11/2005 | Kaminski et al. ............ | 310/261 |
| 2003/0094872 A1 * | 5/2003 | Tornquist et al. ............. | 310/91 |
| 2005/0146231 A1 * | 7/2005 | Or et al. ........................ | 310/26 |
| 2005/0156471 A1 * | 7/2005 | Kobayashi et al. ........... | 310/61 |

FOREIGN PATENT DOCUMENTS

JP 63310367 A * 12/1988

* cited by examiner

*Primary Examiner*—Karl Tamai
*Assistant Examiner*—Ondria Garner
(74) *Attorney, Agent, or Firm*—Carlson, Gaskey & Olds

(57) ABSTRACT

A wound field synchronous machine includes direct oil cooling along a conductive sleeve with elongated semi-arcuate shaped channels which alternate with damper bar channels containing tie-rod supports structures. With a reduction in sleeve thickness permitted by the direct cooling, the overall weight of the machine is reduced.

12 Claims, 14 Drawing Sheets

ROTOR COOLING SYSTEM FOR SYNCHRONOUS MACHINES WITH CONDUCTIVE SLEEVE

BACKGROUND OF THE INVENTION

The present invention relates to a wound field synchronous machine, and more particularly to a coolant system for a reduced weight electric generator system.

Vehicles, such as aircraft, often utilize an electric generator system to provide electric power. The generators convert mechanical energy from rotation of the engine into electrical energy for the vehicle.

The use of conductive sleeves in wound field synchronous machines is commonplace. In some aerospace applications where weight is a critical feature there may be a desire to also use the sleeve to provide additional stiffness to the rotor structure. However, electrical losses may be present in the conductive sleeve due to the changing magnetic field. These losses may cause the temperature of the sleeve to increase to undesirable levels in particular locations related to the changing magnetic fields. A decrease in sleeve thickness provides a weight reduction, but the reduced thickness is a tradeoff in which the temperature increase is exacerbated and the rotor assembly stiffness is reduced.

Accordingly, it is desirable to provide a reduced weight electric generator system that operates at a reduced temperature yet increases rotor assembly stiffness.

SUMMARY OF THE INVENTION

A wound field synchronous machine according to the present invention includes direct oil cooling through a rotor core adjacent a conductive sleeve with elongated semi-arcuate shaped channels which alternate with damper bar channels that contain tie-rod supports structures. The directly cooled conductive sleeve operates at a lower temperature than that of conventional construction. The direct oil cooling minimize localized hot spots and permits the sleeve to be designed for a lower operating temperature. Since the yield strength of the sleeve increases as the max temperature decreases, the lower operating temperature permits the sleeve to be manufactured to a thinner construction yet still maintains the desired yield strength. The thinner sleeve decreases the electro-magnetic losses from eddy currents which subsequently further lowers the sleeve operating temperature such that the sleeve may be manufactured to a still thinner thickness so that an optimal tradeoff of weight and stiffness is achieved such that the overall weight of the machine is thereby reduced.

The present invention therefore provides a reduced weight electric generator system that operates at a reduced temperature yet increases the rotor assembly stiffness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3I is a perspective view of the rotor laminations without the winding bundle

DETAILED DESCRIPTION OF THE PREFERRED EMBODIMENT

Figure 1:
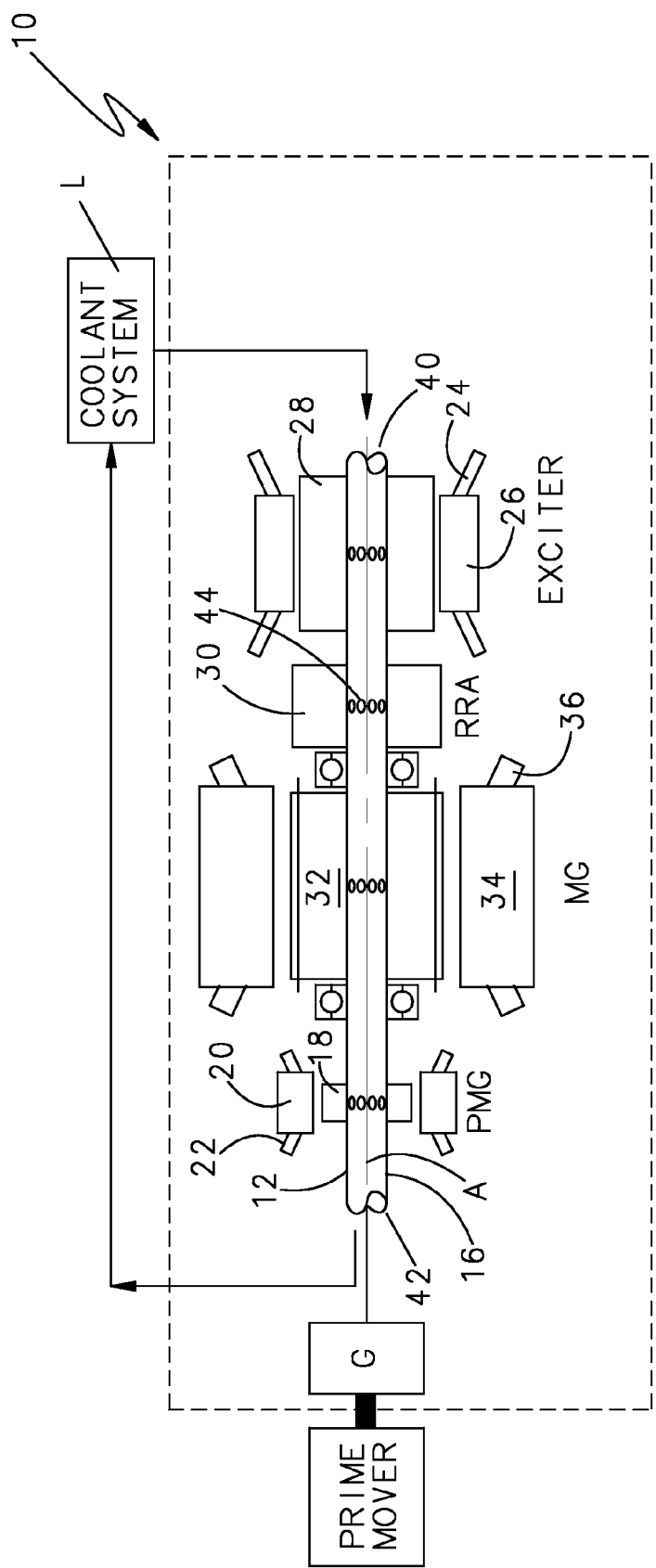
FIG. 1 is a schematic view of an exemplary generator system use with the present invention.

FIG. 1 illustrates a general schematic block view of a brushless electric generator system 10 that includes a rotor assembly 12 driven about an axis of rotation A by a prime mover such as a gas turbine engine E. It should be understood that although the system is described in terms of a synchronous generator, it may also be utilized as a synchronous motor such as in an aircraft starter generator system. It should also be understood that although a particular component arrangement is disclosed in the illustrated embodiment, other arrangements will benefit from the instant invention.

The generator system 10 preferably includes an integral step-up gearbox G, a lubrication system L (also illustrated schematically in FIG. 2), and a PM generator (PMG) for Generator Control Unit (GCU) power. A Main Generator (MG) is preferably a 170/170 kVA two-pole wound field synchronous machine (WFSM) operating nominally at 24000 rpm. Rotor field current is supplied from the output of a rotating rectifier assembly (RRA) 30 which is powered by an Exciter (a smaller WFSM having the field winding on the stator). The GCU provides electrical current to the Exciter field converted from the PMG. Cooling is provided by a coolant oil flow through the common rotor shaft 16. The RRA 30 is in the coolant oil flow path such that a multiple of shaft orifices 44 (illustrated schematically) provide a coolant spray to the RRA, Exciter and MG end-turns. It should be understood that the RRA 30 may be located around and/or within the shaft 16.

The system 10 includes a rotor assembly 12 which supports a series of permanent magnets 18. A stator 20 provided with windings 22 surrounds the magnets 18 and defines the PMG. Electrical current generated in the winding 22 during rotation of the rotor shaft 16 is provided via suitable conductors and an electronic controller (not shown), to windings 24 in an exciter stator 26. Axially aligned with the exciter stator 26 and carried by the rotor shaft 16 are windings 28 in which alternating current is induced during rotation of the rotor shaft 16.

The alternating current induced in the windings 28 is communicated to the RRA 30 where it is rectified to direct current; usually from three phase alternating current. Direct current from the RRA 30 is then fed to a main field winding 32 located in alignment with a main generator stator assembly 34 of the MG. The main stator assembly 34 includes windings 36 in which an alternating current is induced and which, by suitable conductors (not shown), may be connected to suitable loads.

Figure 2:
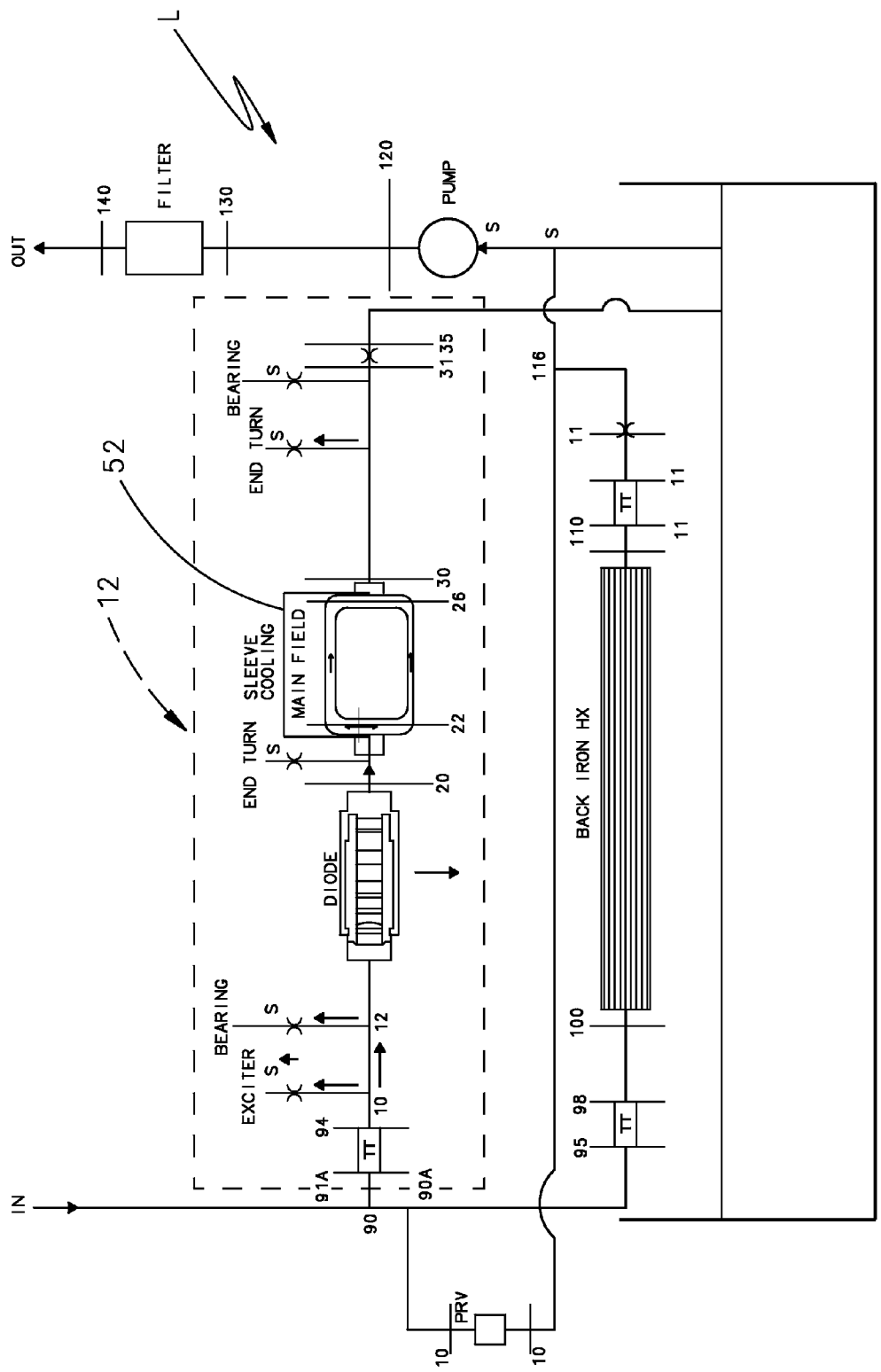
FIG. 2 is a schematic view of a coolant oil system.

To further increase system capacity, the rotor shaft 16 is provided with an oil inlet 40 and an oil outlet 42 to provide a conduit for coolant oil to flow therethrough and be sprayed into the rotor assembly 12 through spray orifices 44. The coolant oil operates to liquid cool the rotor assembly 12 as well as for lubrication purposes (FIG. 2).

Figure 3A:
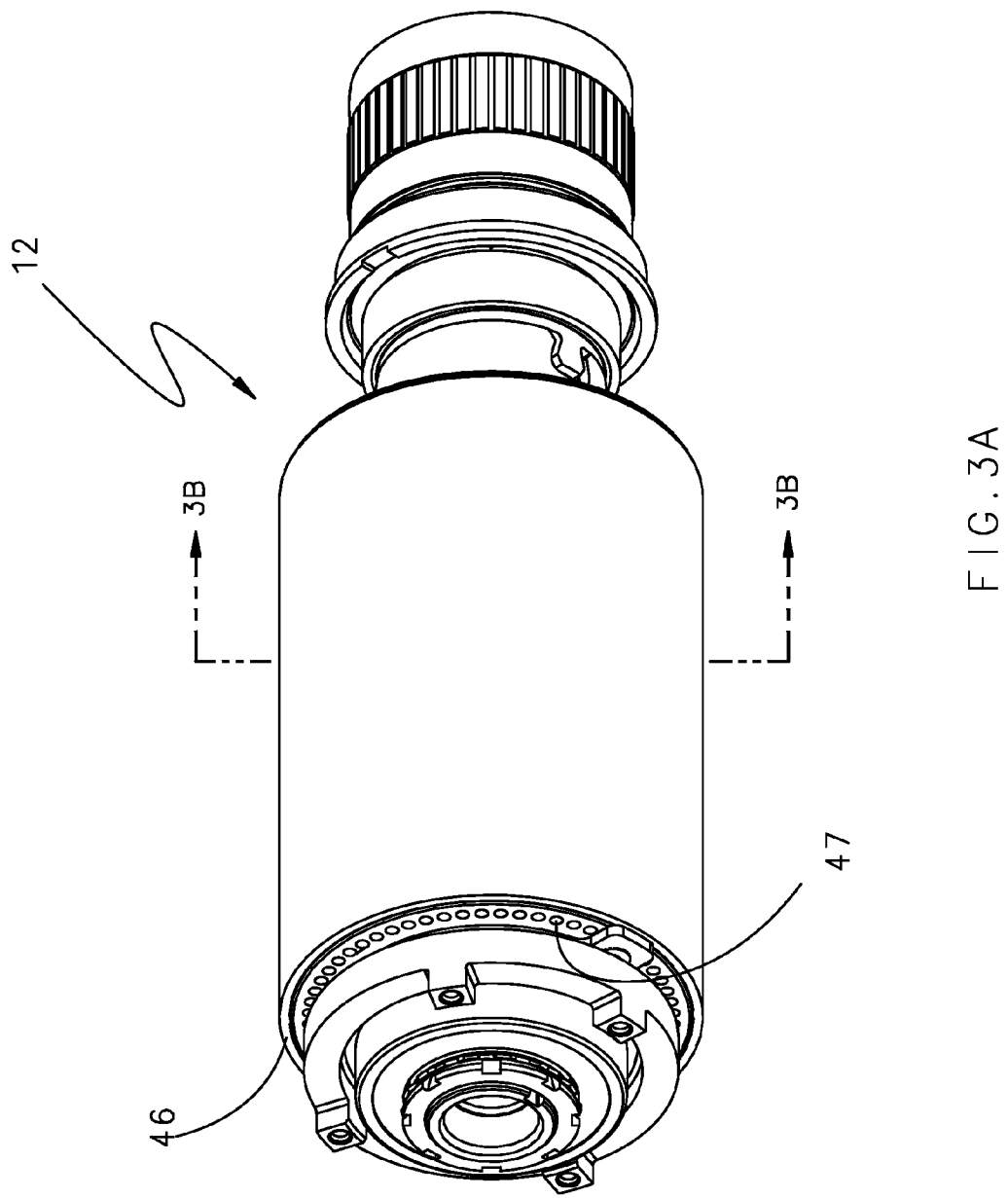
FIG. 3A is a perspective view of a generator system according to the present invention.
Figure 3B:
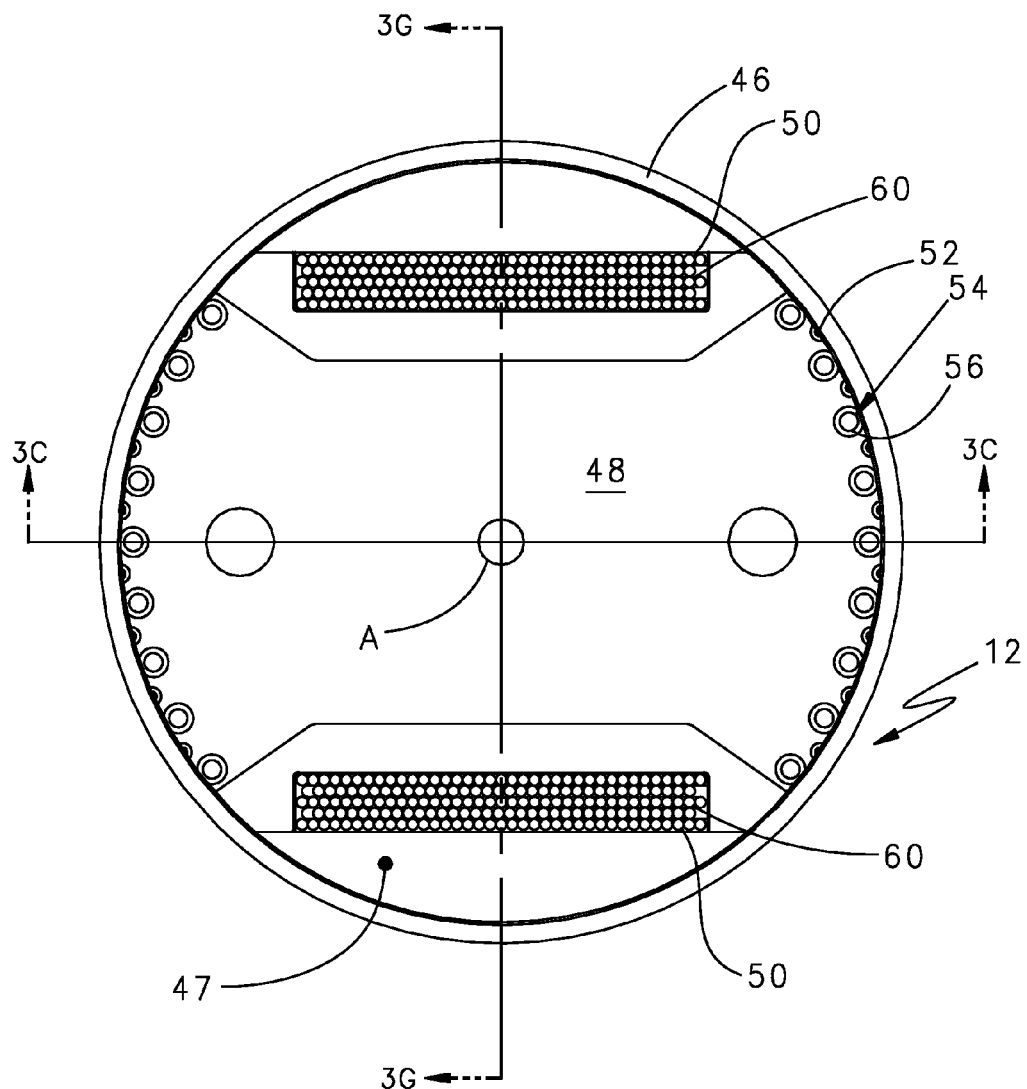
FIG. 3B is a sectional view taken along the line 3B—3B.

Referring to FIG. 3A, the rotor assembly 12 includes a rotor retaining sleeve 46 which surrounds a main rotor core 47 having a multiple of rotor laminations 48 and a main rotor winding bundle 50 (FIG. 3B). The laminations 48 are stacked generally in the plane normal to the axis of rotation A. It should be understood that a solid non-laminated rotor core will also be usable with the present invention. The main rotor winding bundle 50 preferably have five layers of 34-33-34-33-34 turns respectively of #14AWG for a total of 168 turns.

Figure 3C:
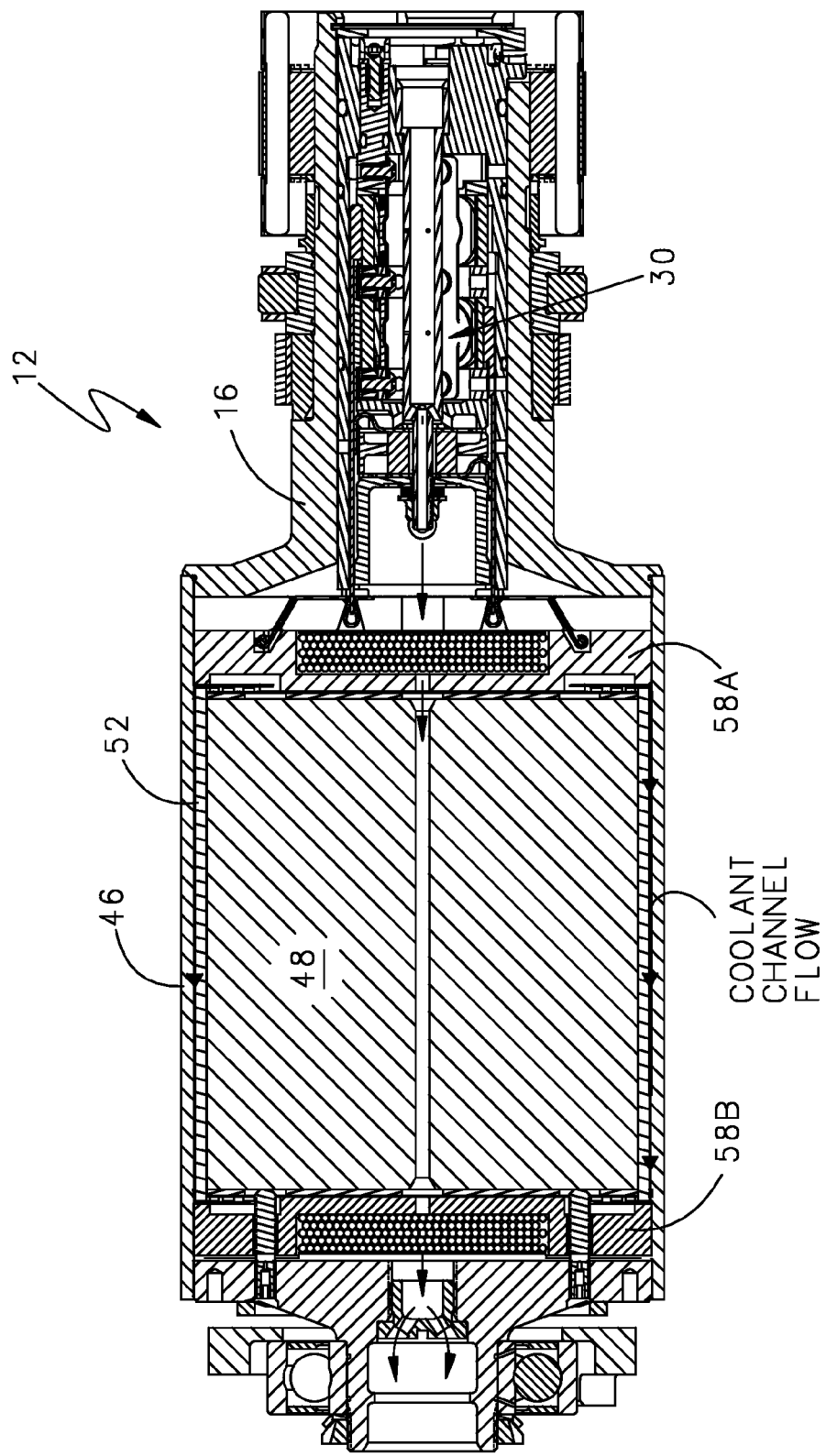
FIG. 3C is a sectional view taken along line 3C—3C.

Referring to FIG. 3C, the rotor retaining sleeve 46 stiffens the rotor core 47 during high speed rotation of the rotor assembly 12. To significantly decrease the machine weight through primarily electromagnetic (E/M) design changes along the main centerline, the main rotor shaft 16 is preferably manufactured of a Titanium alloy. The shaft weight reduction permits a thinner rotor retaining sleeve 46 and a related decrease in the stator ID and OD. This permits a lighter rotor assembly 12 and consequently a thinner and lighter rotor retaining sleeve 46 which permits a smaller E/M gap. Transient performance improves, especially since the electromagnetic gap decrease allowed by the thinner sleeve yields a more power dense, but higher reactance machine. The stator core may then be designed for the constraints dictated by the temperature rise of the windings. The constraints for the number of winding layers and maximum wire size permit determination of the final rotor field winding (and lamination configuration). Since the yield strength of the rotor retaining sleeve 46 increases as the max temperature decreases, the rotor retaining sleeve 46 may be thinner. The thinner sleeve decreases the electromagnetic losses which lowers the rotor retaining sleeve 46 operating temperature and permits a still further decrease in the rotor retaining sleeve 46 thickness until a preferred thickness is obtained.

The rotor retaining sleeve 46 is preferably manufactured of a single material such as non-magnetic stainless, or titanium or a multi-layered sleeve such as a layer of copper, aluminum or silver explosion bonded to a non-magnetic stainless steel or titanium. The outer layer principally for conductivity, inner layer principally for strength. Alternatively, the rotor retaining sleeve 46 may be manufactured of a non-metallic composite material.

Figure 3D:
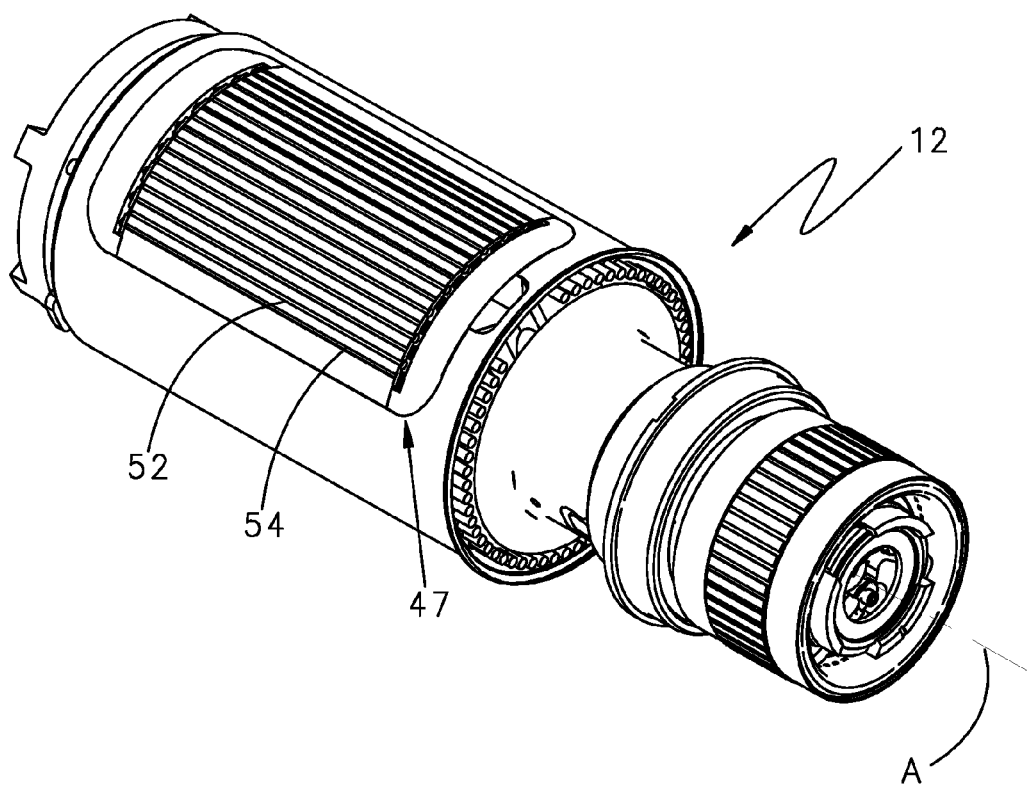
FIG. 3D is a perspective view of the rotor assembly.
Figure 3E:
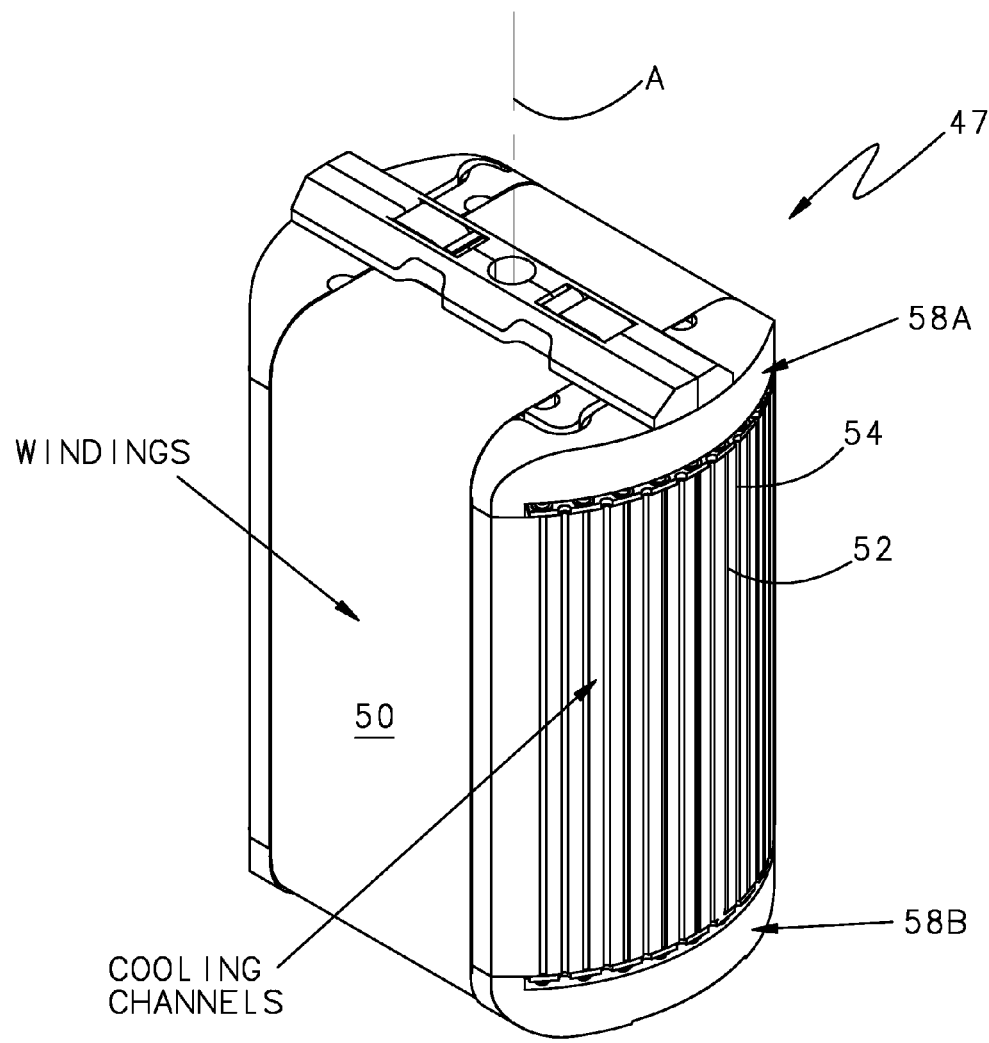
FIG. 3E is a perspective view of the rotor laminations and windings.
Figure 3F:
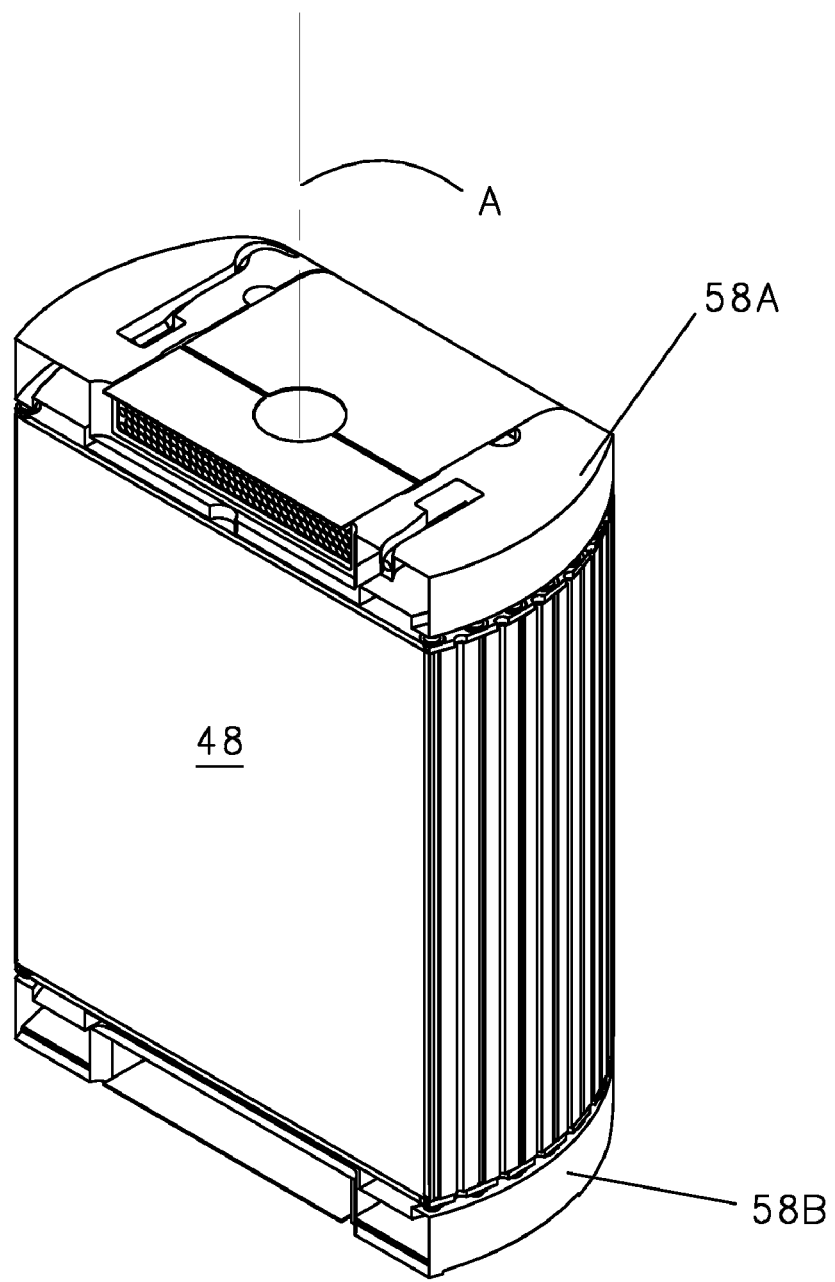
FIG. 3F is a sectional view of the rotor taken along the axis of rotation transverse to the winding bundle
Figure 3G:
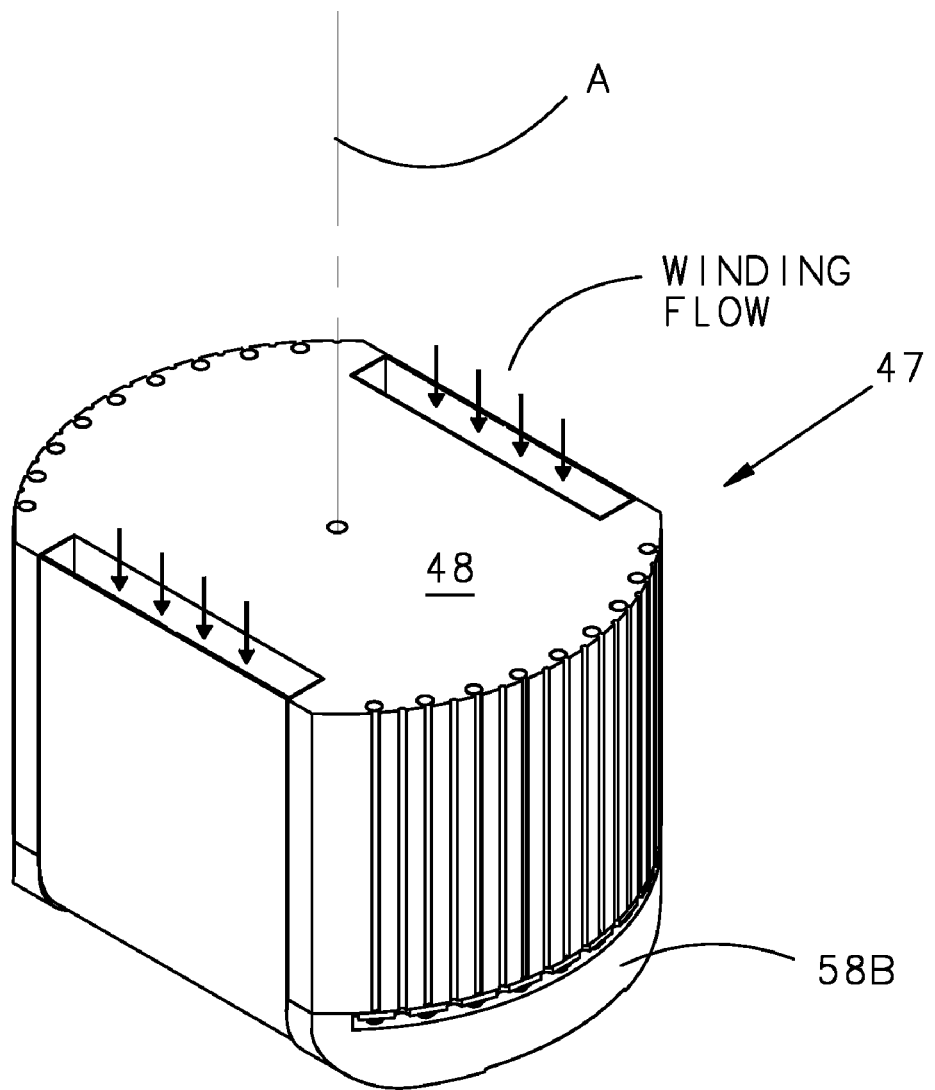
FIG. 3G is a sectional view of the rotor taken through the axis of rotation
Figure 3H:
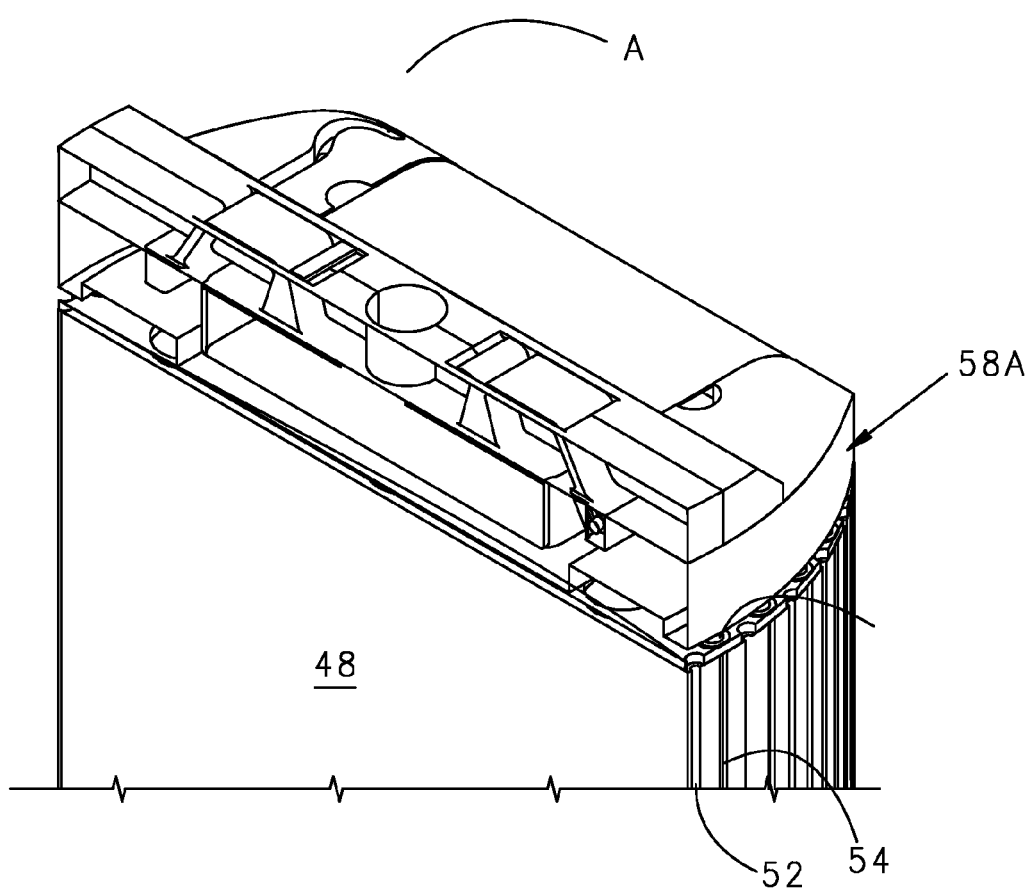
FIG. 3H is an expanded view of FIG. 3F illustrating a winding bridge.
Figure 31:
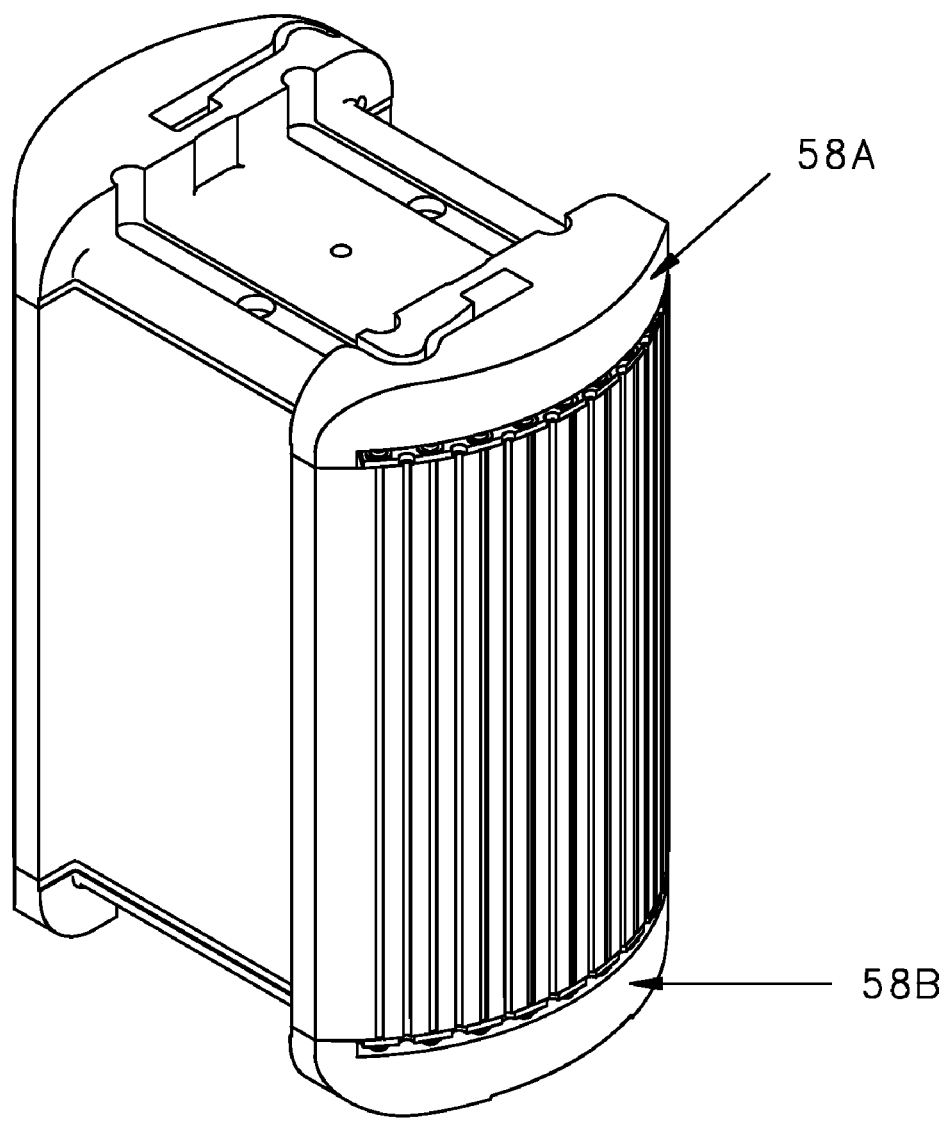

Referring to FIG. 3D, a multiple of sleeve cooling channels 52 and a multiple of damper bar channels 54 are defined along an edge of the laminations 48 (also illustrated in FIGS. 3F–3H). One or more of the damper bar channels 54 may contain a tie-rod 56 (FIG. 3H) mounted therein. The damper bars form part of the damper winding or damper circuit. This is a principally conductive circuit located principally in quadrature with the main field winding. It is similar to a "squirrel cage" rotor conductor circuit found in induction machines. The damper bars (typ. hard copper) are mechanically and electrically connected (typ. brazed or welded) to endplates (typ. copper strips joining damper bars of one pole to those of another) on either end of the core. The purpose of the damper circuit is to reduce or eliminate speed oscillation. Any magnetic field impressed upon the rotor that is rotating asynchmously with the rotor will produce a current in the damper bars and thus a torque which tends to bring the rotor in synchronism with the dominant rotating magnetic field. Preferably, the tie-rods 56 span approximately 76 degrees per pole face about axis of rotation A. Used here, the primary purpose is to mechanically stiffen the rotor—the rotor is weakest in the axis of the damper circuit, so it is convenient to remove a few damper bars and use the now empty slots (in the rotor, where the damper bars typically are) for "tie-rods."

The multiple of sleeve cooling channels 52 are interspersed between damper bar channels 54 to extract heat from the sleeve 46 (FIG. 3C). The multiple of sleeve cooling channels 52 are in fluid communication with the lubricant system L through an end-turn support 58A (FIGS. 3I and 3J).

Figure 3J:
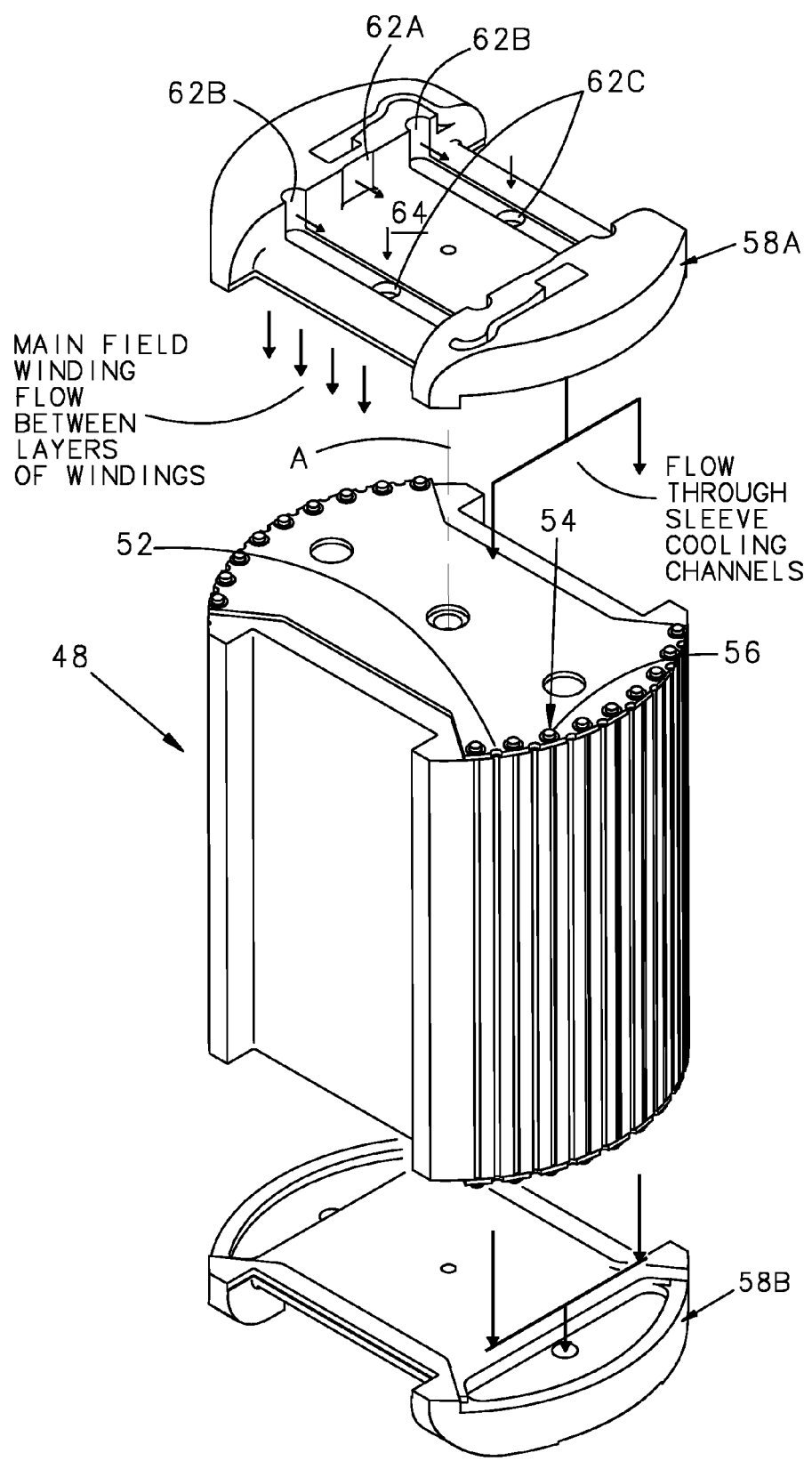
FIG. 3J is an exploded view of the rotor end turn supports and the laminations.

A relatively thin spacer 60 such as a ribbon shaped spacer is weaved between layers of the main rotor windings 50 at either end to allow coolant oil to penetrate (and exit) the winding bundle 50 (FIGS. 3B and 3J). That is, the spacer 60 provides some separation between the winding bundle layers such that the coolant oil may flow therebetween.

Figure 3K:
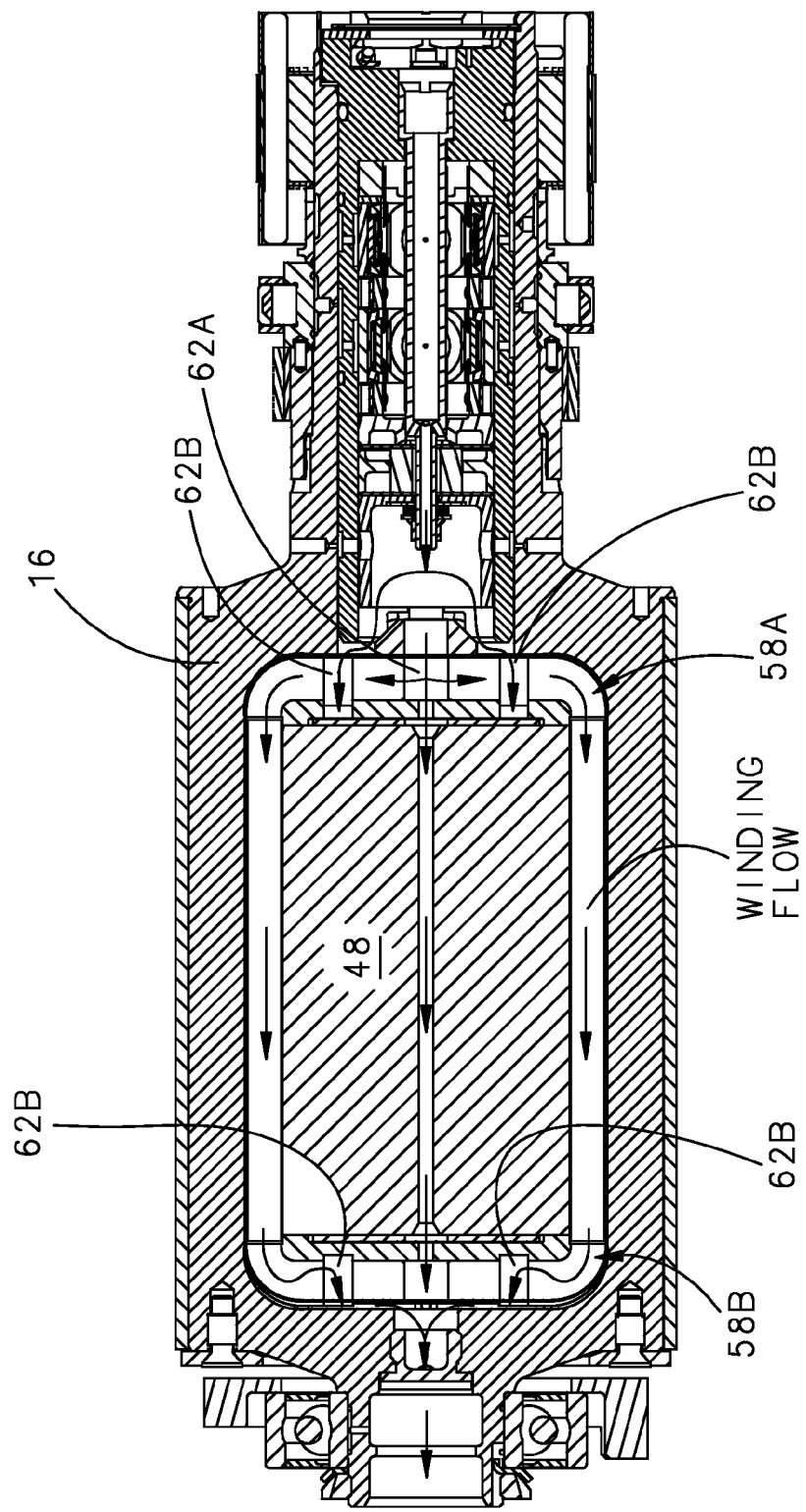
FIG. 3K is a sectional view taken along the line 3G—3G in FIG. 3B.
Figure 3L:
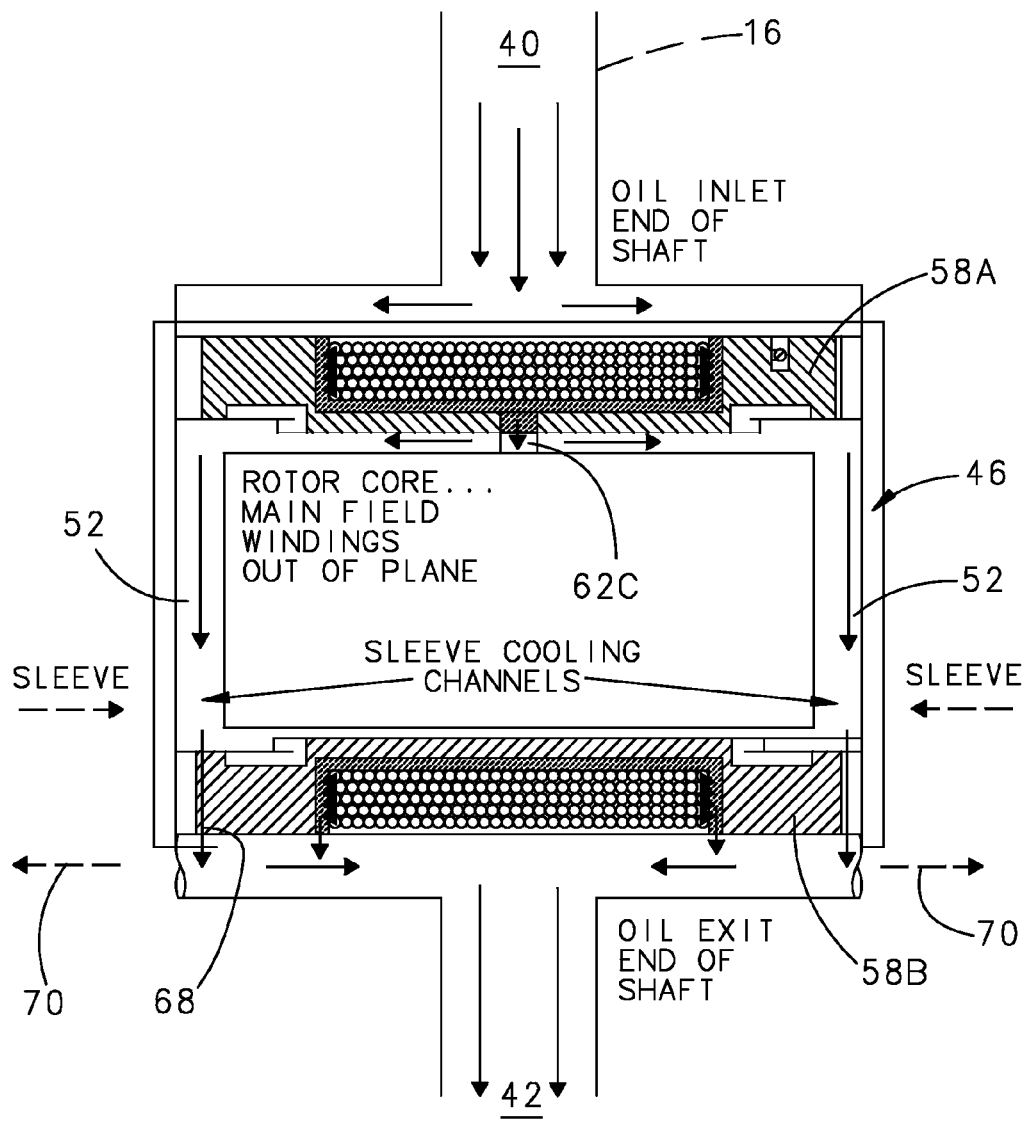
FIG. 3L is a schematic view of coolant oil flow through the rotor assembly.

Referring to FIG. 3J, the end-turn support 58 defines coolant oil channels 62A–62B. The wire bundle coolant channels 62A (FIG. 3B) provide a dedicated flow path into the winding bundle 50 (FIG. 3K). The coolant channels 62B wrap the wiring bundle 50 to provide a coolant oil path to a cooling opening 62C which feeds the sleeve cooling channels 52 adjacent the sleeve 46 (FIGS. 3C and 3L). That is, the channels 62A provide oil coolant flow into the winding bundle 50 and coolant channels 62B provide flow generally around the winding bundle and into the channels 52. Notably, centrifugal force drives the coolant oil outward to the sleeve cooling channels 52.

The dedicated coolant path provided by the sleeve cooling channels 62 and the separation of the winding layers facilitate cooling and minimize localized hot spots formed in the rotor retaining sleeve 46 which allows the rotor retaining sleeve 46 to be designed to lower temperatures than that of conventional construction.

The directly cooled conductive sleeve operates at a lower temperature than that of conventional construction. The direct oil cooling minimize localized hot spots and permits the sleeve to be designed for a lower operating temperature. Since the yield strength of the sleeve increases as the max temperature decreases, the lower operating temperature permits the sleeve to be manufactured to a thinner construction yet still maintains the desired yield strength. The thinner sleeve decreases the electromagnetic losses from eddy currents which subsequently further lowers the sleeve operating temperature such that the sleeve may be manufactured to a still thinner thickness so that an optimal tradeoff of weight and stiffness is achieved such that the overall weight of the machine is thereby reduced.

Referring to FIG. 3H, coolant oil flow enters the shaft 16 from the transfer tube 65 (FIG. 3K). The orifices 44 (FIGS. 1 and 2) divert some of the coolant oil to provide dedicated spray cooling to the RRA 30 exciter stage, main stator windings, gear mesh, and bearings. The primary rotor cooling path, however, is through the RRA 30 and into the main field 32 and sleeve 46.

The coolant oil flow from the shaft 16 impinges directly on the end region of the main rotor winding bundle 50 which is supported by the end support 58. The end region is supported in the saddle shaped region 64 (FIG. 3J). The coolant channel 62A permits the spacer 60 to be wound between winding layers as well as provide a coolant oil flow path. The coolant channels 62B permit coolant oil to pass around and beneath the main rotor winding bundle 50 and flow into the sleeve cooling channels 52.

Coolant oil flows through the sleeve cooling channels 52 and returns to the interior of the shaft 16 through coolant openings 68 in the end support 58B. The coolant oil in the winding bundle returns to the rotor shaft 16 through the coolant channels 62B in the opposite end support 58B. A portion of the return flow may alternatively or additionally exit the shaft 16 through stator spray orifices 70 (illustrated schematically) to provide cooling spray to other components (FIG. 1).

Alternatively, to increase the stiffness of the rotor, tie rods are placed in the in slots from which alternating damper bars are removed as the span of the damper slots tends to be relatively more significant than the actual number. The tie rods may be threaded along one end segment and have a head on the other. The tie-rods are then passed through, for example, the shaft window overhang and though the empty damper bar slots.

An alternative method for sleeve cooling utilizes the damper bar channels as the oil coolant channels rather than the dedicated channels disclosed above.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A generator system comprising:
    a rotor assembly including a rotor retaining sleeve which surrounds a main rotor core having a multiple of rotor laminations and a main rotor winding bundle, said multiple of rotor laminations stacked generally in a plane normal to an axis of rotation of said rotor assembly; and
    a coolant system in communication with said rotor assembly, said coolant system communicating a coolant oil between a periphery of said main rotor core and said sleeve, said coolant system communicating said coolant oil through at least one of a multiple of coolant channels generally parallel to said axis of rotation defined along an edge of said multiple of rotor laminations and through a main rotor winding bundle generally parallel to said axis of rotation, said main rotor winding bundle rotationally offset from said multiple of coolant oil channels;
    a spacer located between at least two layers of said main rotor winding, wherein said spacer is ribbon-shaped and weaved between said at least two layers of said main rotor winding.

2. The generator system as recited in claim 1, wherein said rotor assembly includes a multitude of damper slots about said periphery of said main rotor core.

3. The generator system as recited in claim 2, wherein said multitude of damper slots are interspersed with said multitude of coolant channels, said multitude of coolant channels defined between said main rotor core and said sleeve.

4. The generator system as recited in claim 2, wherein said coolant system communicates said coolant oil through at least one of said multitude of damper slots.

5. The generator system as recited in claim 1, wherein said coolant system communicates said coolant oil through a rotor shaft to impinge upon an end turn support of said main field winding of said rotor assembly.

6. The generator system as recited in claim 5, wherein said rotor shaft is manufactured of a titanium alloy.

7. The generator system as recited in claim 1, wherein said spacer provides a separation between said at least two layers such that said coolant oil may flow therebetween.

8. The generator system as recited in claim 1, wherein said rotor retaining sleeve is manufactured of a conductive material.

9. The rotor assembly as recited in claim 1, wherein said multitude of cooling channels are located in a periphery of said main rotor core adjacent said sleeve.

10. The rotor assembly as recited in claim 9, wherein each of said cooling channels are semi-arcuate recesses formed in the periphery of said main rotor core.

11. The rotor assembly as recited in claim 9, wherein at least one of said multitude of cooling channels is located parallel to a damper slot.

12. The rotor assembly as recited in claim 11, further comprising a tie-rod located within said damper slot.

* * * * *